Dec. 6, 1960 M. P. ESPY 2,962,721
HAND CARRIED GLARE SHIELD
Filed May 8, 1958 2 Sheets-Sheet 1

INVENTOR.
MELVIN P. ESPY
BY
Reynolds, Beach & Christensen
ATTORNEYS

Dec. 6, 1960 M. P. ESPY 2,962,721
HAND CARRIED GLARE SHIELD
Filed May 8, 1958 2 Sheets-Sheet 2
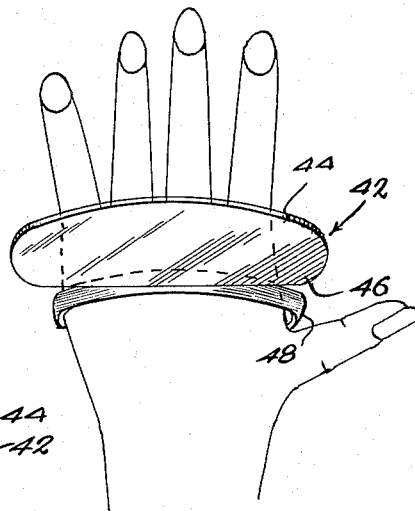
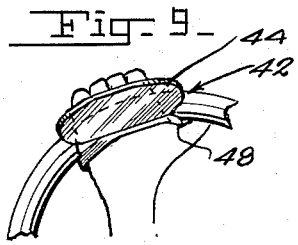
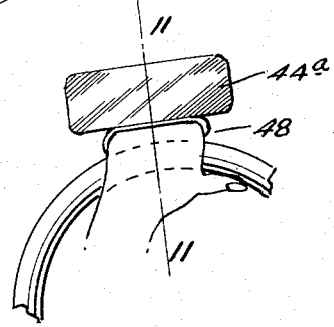
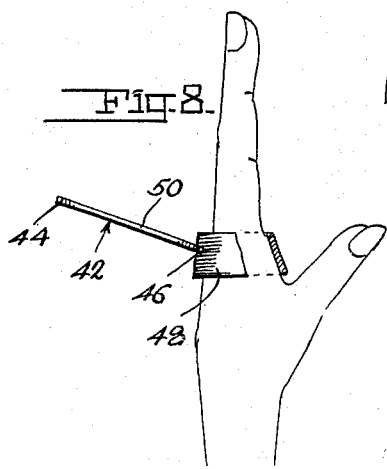
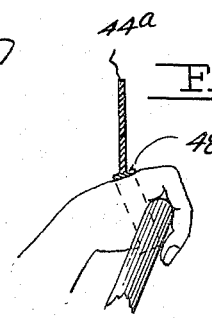
INVENTOR.
MELVIN P. ESPY
BY
Patrick D. Beavers
ATTORNEY

United States Patent Office 2,962,721
Patented Dec. 6, 1960

2,962,721

HAND CARRIED GLARE SHIELD

Melvin P. Espy, 17941 Riviera Place SW.,
Seattle 66, Wash.

Filed May 8, 1958, Ser. No. 734,384

9 Claims. (Cl. 2—11)

This invention appertains to improvements in devices for eliminating glare from the field of vision of the driver of an automotive vehicle and is particularly directed to new and improved hand-carried glare shields which may be operatively positioned and retracted at will by the driver without interfering with normal and safe driving practices with relation to use of the hands.

The present application is a continuation-in-part of Serial No. 514,533, filed June 10, 1955.

A primary object of this invention is to provide a glare shield, which is provided with means for attaching it to the hand of the driver of a vehicle in such a position that the shield is disposed operatively projecting upwardly into the path of vision from the back of the hand with the hand on the steering wheel in a normal and comfortable position, and can be easily and conveniently moved out of the field of vision when desired by shifting the hand to a different but also comfortable and normal driving position on the steering wheel, such shield being attached to the hand in such a manner as not to interfere with the normal use of the hand in manipulating the vehicle and in operating the controls of the vehicle.

Another object of this invention is to provide a hand mounted and carried glare shield, which can be readily moved into position to protect the driver's eyes under a variety of locations of the source of the glare and which can be moved into various positions, as the source of the glare moves across the driver's field of vision, without taking the hand from the steering wheel and without encumbering the hand for the normal usages while driving.

A further and related object is to provide an improved glare shield, particularly with relation to the safe, convenient and unobstructive mounting thereof on the driver's hand, permitting the same to be shifted into and from operative position without taking the hand from the wheel.

A specific object of the preferred embodiment is a readily demountable glare shield which will become dislodged rather than break or interfere with emergency use of the hands under certain conditions, or which may be removed instantly so as to free the hands altogether from a projecting shield when desired.

A further object is a glare shield and mounting means therefor which is so formed and located in relation to the hand as to occupy only the required region in the field of vision necessary to shield the eyes from the glare of oncoming headlights and the like, so that adjacent and surrounding areas which must be clearly observed for safe driving are undimmed and unobstructed.

The foregoing and ancillary objects, including the provision of a simple and inexpensive glare shield, are attained by this invention, the preferred forms of which are set forth in the following description and illustrated in the accompanying drawings, wherein:

Figure 7 is a rear elevational view of a less preferred and more rudimentary form of the glare shield, wherein the sheet is permanently jointed directly to a hand-encircling flexible band and is of generally oblong quadrangle form.

Figure 8 is a side elevational view thereof.

Figure 9 is a perspective showing of the shield in attachment to the hand of the driver and illustrating the hand gripping the steering wheel of the vehicle.

Figure 10 is a modified form of shield and illustrates the shield attached to the hand of the driver, and Figure 11 is a cross-sectional view taken on line 11—11 of Figure 10.

Figure 1:
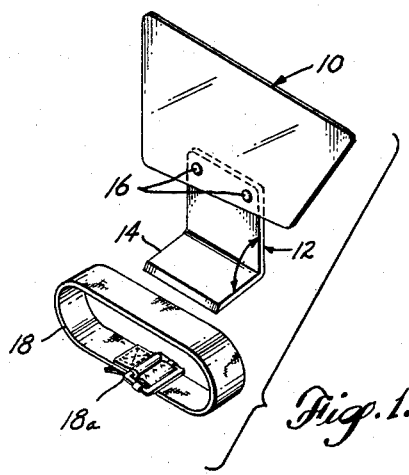
Figure 1 is a perspective view of the improved hand-carried glare shield in its preferred form.
Figure 2:
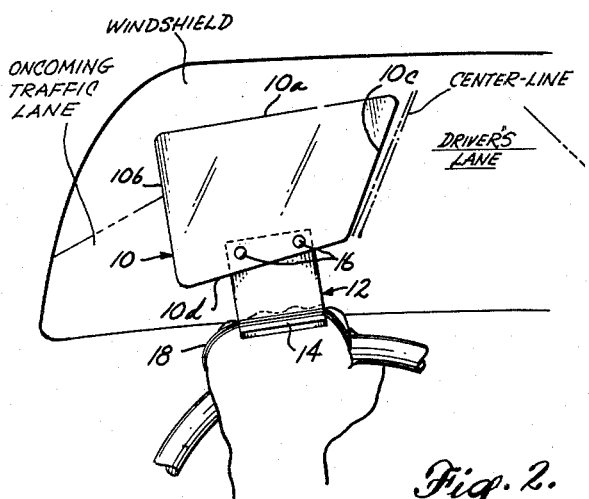
Figure 2 is a front view of the same held in its operative position as viewed by the driver.
Figure 3:
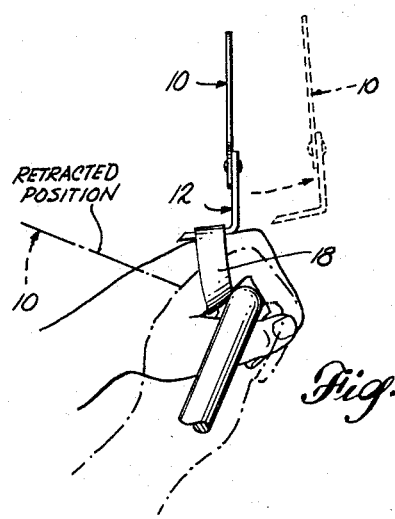
Figure 3 is a side view thereof illustrating the ready detachability feature and one convenient technique for retracting the device from the field of vision.

Referring to Figures 1, 2 and 3, the novel glare shield comprises the rigid or semi-rigid sheet or panel 10 of a tinted transparent plastic material of generally oblong quadrangle form. The material comprising the sheet 10 may be of any suitable type and the means therein by which glare is attenuated or filtered may vary, the object being to dim the intense glow of oncoming headlights or other sources of glare without obscuring them altogether, so that the driver may at all times be apprised of the relative position of the oncoming vehicles and of other objects.

The shield 10 in this preferred embodiment is mounted on a rigid transparent plastic plate or post 12 having a transversely turned end portion 14. In the example the upper end of the plate 12 is secured as by rivets 16 to the lower midportion of the glare shield 10. Preferably the supporting plate 12 is of clear, untinted plastic and raises the lower edge of the glare shield 10 sufficiently above the level of the driver's hand, with the shield operatively positioned as in Figure 2, that critical areas within the field of vision beneath the shield may be viewed in their full light intensity so as to insure against any unnecessary obstruction of view which could lead to accidents or damage due to unseen road hazards.

The preferred embodiment of the glare shield is completed by the provision of a hand-encircling elastic band 18 preferably of knitted or woven fabric and rubber construction, such as that used in garters or in the arm bands which men wore around the upper portion of their shirt sleeves in a bygone day. This positionally self-retaining band is worn on the driver's left hand preferably and at a location where it encircles the palm and the back side of the hand between the knuckles and the wrist and passes through the base of the crotch between the thumb and the index finger. An adjustment buckle or take-up clamp 18a permits adjusting the band's length to accommodate hands of different size. The turned end element 14 of the supporting post is slipped under the band 18, which pockets it against the back side of the hand, with the projecting end of the element 14 directed toward the wrist, as shown best in Figure 3. As a result, the shield 10 is mounted in an upstanding position on the back side of the hand, since the flat lower surface of the turned end portion 14 is relatively wide and relatively long, so as to provide a stable base which bears flatly along or in contact with the relatively flat back side of the hand. The upright or main portion of the supporting post 12 and the end element 14 thereof are preferably disposed relatively at an obtuse angle slightly greater than a right angle, so that with the hand oriented in a comfortable position as in Figure 3 on top of the steering wheel, the back side of the hand sloping slightly downward to the rear, the shield will be substantially vertical.

As shown by the dotted line illustration of the shield and mount in Figure 3, the shield is readily removable from the band simply by sweeping it forwardly from the band. This will occur without damaging the shield nor injuring the hand should an emergency arise in which the driver has to maneuver his hand too quickly to remove the shield beforehand. The shield is simply swept from the back of the hand in case it encounters any object which would constitute an obstruction were not the shield readily removable. Alternatively, the shield may be removed in an instant simply by lifting it from place with the other hand.

The particular quadrangle form of the shield as shown in this embodiment is the preferred form inasmuch as it enables the driver to view all areas within the field of vision with unattenuated light intensity, except those areas which require dimming in order to shield the eyes from glare, such as the glare of oncoming headlights. To this end the upper edge 10a is preferably oriented substantially parallel to the plane of the mounting plate end portion 14, and the left edge 10b is substantially perpendicular to the edge 10a, although the left edge 10b and the upper edge 10a are not particularly critical as to their precise form. They may be rounded, angled, concave, convex, or of some other specific form. Alternatively, the upper left corner may be rounded or angled if desired. Preferably the right edge 10c is inclined downwardly and to the left from the vertical (i.e. from parallelism with edge 10b), by an angle in the vicinity of 30 degrees, whereas the lower edge 10d is preferably disposed at a large acute angle (such as 80 degrees) in relation to the left edge 10b. It is found that this relationship between the right and lower edges enables the driver by simply shifting the hand along the upper portion of the steering wheel, with the shield operatively positioned, to follow the line of relative approach of the oncoming headlights without in any way obstructing or diminishing the view of his own driving lane and without obstructing the critical areas at the left and beneath the glare shield during the process. In a typical example, the length of the upper edge 10a is approximately five and five-eighths inches, that of the left edge 10b approximately three and three-eighths inches, and that of the lower edge 10d approximately four inches. The length of the post or supporting plate 12 between the end portion 14 and the lower edge 10d of the shield is preferably about one and one-fourth inches.

In order to shift the hand-carried shield out of its operative position as shown in Figure 2 into a position where it is altogether or substantially removed from the field of view the driver may find it convenient to simply slide the hand around the steering wheel downwardly and to the left until the shield is out of the way, without detaching it from the hand, or he may simply drop his wrist as shown by broken lines in Figure 3 without removing his grip from the wheel and without shifting his hand from its position near the top of the wheel and slightly to the left of the vertical diameter thereof. This latter movement swings and displaces the shield downwardly, yet at all times the driver's hand remains on the wheel in a safe and comfortable position. Moreover, inasmuch as the elastic band 10 is the only element on the palm side of the hand and inasmuch as there are no elements in any way interfering with the movement and positioning of the thumb and fingers of the hand, the shield in no way hinders the safe and convenient use of the hands in driving and controlling the vehicle. As previously mentioned, if the hand on occasion should have to be moved quickly into a confined space, as for operating an emergency brake or the like, the shield will simply be swept from the hand in case it encounters any portion of the vehicle which would otherwise interfere with such movement of the hand.

Figure 4:
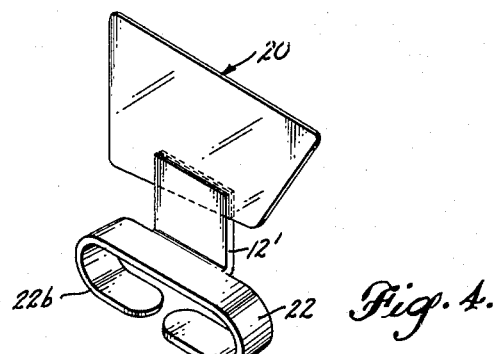
Figure 4 is a perspective view of a less preferred modification involving a somewhat different mounting.

In the modification shown in Figure 4, the shield comprises the sheet or plate 20 usually similar to that shown in Figure 1 and is mounted on a post or plate 12', in this case by slotting the upper end of the plate 12' in a plane parallel to its own body plane and inserting the lower edge of the sheet 20 into the slot, to be held by a suitable transparent adhesive or otherwise. In this case, the post or supporting plate 12' comprises an upstanding tab mounted on a split band 22 which is formed of a resilient plastic material or is of equivalent construction enabling its side portions 22a and 22b to be spread apart in order to receive the palm section of the hand therebetween and to resiliently recoil and grip such palm section much in the manner as the elastic band 18 in the first described embodiment. The shield and the dimensions thereof as well as of the post 12' are preferably substantially the same as in the first described embodiment.

Figure 5:
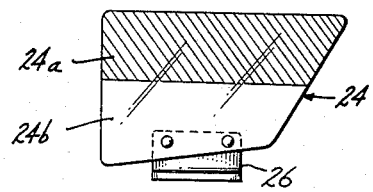
Figure 5 is a front view of a modified shield which preferably employs a mounting similar to that of Figure 1.

In the modification shown in Figure 5, the shield comprises the two-tone sheet or plate 24, the upper or main filter panel portion 24a of which is of approximately the same size and shape as the shield 10 in the first embodiment and is of a relatively dark tint, whereas the lower portion 24b, constituting a downward continuation of the upper portion 24a, is of a relatively light tint or is altogether nonattenuating. The height of the portion 24b approximates the upwardly projecting length of the supporting post 12 in the preceding embodiments. A mounting bracket 26 of transparent plastic material, similar to the material and form of the lower section of the support 12 in the first embodiment, including the turned end portion 14, is suitably secured to the plate near its lower edge as shown. Such a shield offers the advantage that the intense glare region is appropriately shielded by the relatively highly attenuating area 24a whereas pavement reflections and the like which emanate from a region immediately ahead of the vehicle are attenuated to a lesser extent by the less highly attenuating area 24b, yet nearby objects are readily seen through the area 24b. The panel portion 24b is in essence the equivalent of the support plate 12 in the first described embodiment, except for any glare attenuating function which it may perform over a substantial area. Such a shield as in Figure 5 may be mounted and used in substantially the same manner as the first described shield.

Figure 6:
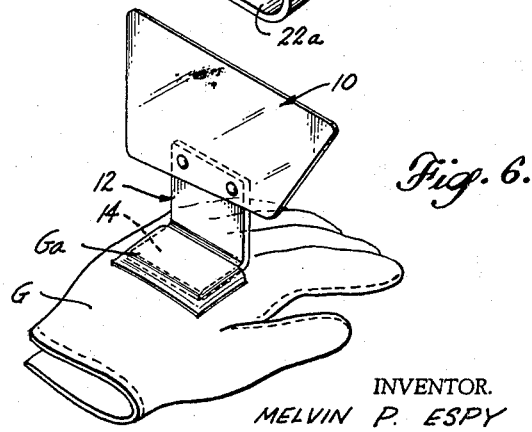
Figure 6 is a perspective view of the shield of Figure 1 and still another mounting arrangement.

In Figure 6 is illustrated an alternative mounting means on the hand for the basic glare shield in the form shown in Figure 1. In this case a driving glove G is provided with a forwardly open pocket or loop $G_a$ on the back side, and into this pocket the turned end portion 14 of the glare shield is inserted. In effect, the glove or a portion thereof comprises a girth band which encircles the palm section of the hand as in the case of a simple elastic band.

In the modification of the shield shown in Figures 7 to 9, inclusive, a relatively rudimentary form of the invention is depicted. In this case, the shield 42 comprises the rigid or semi-rigid filter sheet 44 of substantially oval form. The lower edge 46 is permanently joined in any suitable manner to a positionally self-retaining flexible hand band 48 which slips over the palm portion of the hand to the base of the crotch at the thumb. The band 48 has a substantial width measured lengthwise of the hand so that with the shield mounted substantially rigidly on the back side of the band the shield tends to maintain a certain angular relationship with the flat back side of the hand. In this instance, it is preferred, as in the previous embodiments, that the angular position of the shield 50 with relation to the plane of the back side of the hand be less than 90 degrees as measured between the forward face 50 and said plane.

In the slight variation shown in Figure 10, the shield panel 44a is of substantially rectangular form and has somewhat rounded corners. In other respects the construction is the same as in Figures 7 to 9, inclusive.

While the invention has been described in its preferred embodiments, it will be recognized that certain modifications and changes therein with respect to details may be made without departing from the essential features involved.

I claim as my invention:

1. A hand-carried automobile driver's glare shield comprising a transparent panel of glare-attenuating material of such a size that when mounted in predetermined positional relationship to one hand of the driver so as to project upward from the back side of the hand, with the latter stationed on the upper portion of a steering wheel, such shield subtends a fractional portion of the driver's forward field of vision, and means for mounting said panel in such a positional relationship comprising girth band means adapted to be fitted to the driver's hand and to self-retentively engage the hand by extending transversely across the back of the hand behind the knuckles thereof, thence forwardly and at least partially across the palm side thereof, and support means adapted to project upwardly from said girth band means, engaged supportingly thereby, at the back side of the hand, and having an upper end portion connected to the panel for supporting the panel in such positional relationship independently of flexure and gripping action of the fingers, whereby the fingers and the palm side of the hand are free to drive and control the automobile without interference from or with the shield.

2. The shield defined in claim 1, wherein the support means is integrally connected to the girth band means to be supported thereby standing upward from the back of the hand so stationed and is integrally connected to the lower edge portion of the panel, said support means having material projecting length maintaining a gap of relatively unobstructed and unattenuated visibility over the top of the hand and beneath said panel.

3. The shield defined in claim 2, wherein the support means comprises a strip of transparent material.

4. The shield defined in claim 1, wherein the girth band means comprises an elastic band adapted to completely encircle and resiliently grip the palm section of the hand at the crotch of the thumb.

5. The shield defined in claim 4, and support means connected to the panel's lower edge portion and releasably engageable with said elastic band on the back side of the hand.

6. The shield defined in claim 4, and support means connected to the panel's lower edge portion and releasably engageable with said band on the back side of the hand, said support means comprising a member projecting downwardly from the lower edge portion of the panel and having an end portion projecting transversely from the plane of the panel and adapted to lodge and be retained beneath said band.

7. A hand-carried automobile driver's glare shield comprising a transparent panel of glare-attenuating material of such a size that when mounted projecting upward from the back side of the driver's hand grasping the upper portion of a steering wheel such shield subtends a fractional portion of the driver's forward field of vision, said panel having approximately parallel top and bottom edges and having a right-hand edge which inclines upwardly and to the right by an acute angle of the order of 30 degrees to a line perpendicular to the upper edge, and means for mounting said panel comprising girth band means adapted to be fitted to the driver's hand and to self-retentively engage the hand by extending across the back, thence forwardly and at least partially across the palm of the hand at the thumb crotch, said panel having a lower edge portion, and rigid means connected between said girth band means, at a relative location on the back side of the hand, and said lower edge portion, said rigid means being adapted thereby to maintain the shield in erect position in relation to the back side of the hand independently of flexure and gripping action of the fingers, whereby the fingers and the palm side of the hand are free to drive and control the automobile without interference from or with the shield.

8. The shield defined in claim 7, wherein the girth band means comprises an elastic band adapted to completely encircle and resiliently grip the palm section of the hand at the crotch of the thumb.

9. The shield defined in claim 8, wherein the rigid means comprises a member projecting downwardly from the lower edge portion of the panel and having a lower end portion projecting transversely from the plane of the panel and adapted to lodge under the band and be retained beneath said band against the back of the hand.

References Cited in the file of this patent

UNITED STATES PATENTS

| | | |
|---|---|---|
| 1,370,933 | Torkelson | Mar. 8, 1921 |
| 1,597,806 | Kvare | Aug. 31, 1926 |
| 2,125,996 | Elliott | Aug. 9, 1938 |
| 2,173,962 | Digman | Sept. 26, 1939 |